(12) United States Patent
Smith

(10) Patent No.: US 7,495,612 B2
(45) Date of Patent: Feb. 24, 2009

(54) METHOD AND APPARATUS TO IMPROVE ADS-B SECURITY

(75) Inventor: Alexander E. Smith, McLean, VA (US)

(73) Assignee: ERA Systems Corporation, Reston, VA (US)

( * ) Notice: Subject to any disclaimer, the term of this patent is extended or adjusted under 35 U.S.C. 154(b) by 0 days.

(21) Appl. No.: 11/257,416

(22) Filed: Oct. 24, 2005

(65) Prior Publication Data

US 2006/0119515 A1 Jun. 8, 2006
US 2009/0009395 A9 Jan. 8, 2009

Related U.S. Application Data

(60) Continuation-in-part of application No. 11/209,030, filed on Aug. 22, 2005, now Pat. No. 7,248,219, and a continuation-in-part of application No. 11/203,823, (Continued)

(60) Provisional application No. 60/123,170, filed on Mar. 5, 1999, provisional application No. 60/343,237, filed on Dec. 21, 2001, provisional application No. 60/440,618, filed on Jan. 17, 2003, provisional application No. 60/534,706, filed on Jan. 8, 2004.

(51) Int. Cl.
*G01S 3/02* (2006.01)
*G01S 13/02* (2006.01)
*G08B 21/00* (2006.01)

(52) U.S. Cl. .................. 342/450; 342/32; 340/686.1
(58) Field of Classification Search ............ 342/29, 342/32, 36, 450, 455, 456; 701/120; 340/539.13, 340/686.1
See application file for complete search history.

(56) References Cited

U.S. PATENT DOCUMENTS 1,738,571 A 12/1929 Gare ........................ 404/18

(Continued)

FOREIGN PATENT DOCUMENTS

JP 9-288175 A 11/1994

(Continued)

OTHER PUBLICATIONS

Airport Pavement Management Systems: An Appraisal of Erxisting Methodologies, Michel Gendreau and Patrrick Soriano;Pergamon Transn Res. A, vol. 32, No. 3, pp. 187-214, 1998.

(Continued)

*Primary Examiner*—Dao L Phan
(74) *Attorney, Agent, or Firm*—Robert Platt Bell

(57) ABSTRACT

Security of ADS-B transmissions is improved in a first embodiment to detect position spoofing. The annunciated position source may then be compared with the derived source and a determination is made regarding the difference between the results. Any position difference greater than an amount significantly greater than the combination of the error sources is then a cause for concern and can be used to generate an alert. In a second embodiment, alerting may be based on identification spoofing. From these sources a correlated ID is available which will have an associated confidence based on the number of sources and the level of agreement on the information. Aircraft dynamics may be correlated with the announced ID for consistency. A priori information on the aircraft and location, such as schedule information, and normal operations, may be used to assist in the confidence of aircraft identity. In a third embodiment, alerting may be based on spoofing of identity and position.

8 Claims, 6 Drawing Sheets

Related U.S. Application Data filed on Aug. 15, 2005, and a continuation-in-part of application No. 11/145,170, filed on Jun. 6, 2005, now Pat. No. 7,437,250, and a continuation-in-part of application No. 11/111,957, filed on Apr. 22, 2005, now abandoned, and a continuation-in-part of application No. 11/031,457, filed on Jan. 7, 2005, which is a continuation-in-part of application No. 10/830,444, filed on Apr. 23, 2004, now Pat. No. 7,123,192, and a continuation-in-part of application No. 10/756,799, filed on Jan. 14, 2004, now Pat. No. 7,126,534, which is a continuation-in-part of application No. 10/751,115, filed on Jan. 5, 2004, now Pat. No. 6,992,626, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a division of application No. 10/457,439, filed on Jun. 10, 2003, now Pat. No. 6,885,340, and a continuation-in-part of application No. 10/319,725, filed on Dec. 16, 2002, now Pat. No. 6,812,890, which is a continuation-in-part of application No. 09/971,672, filed on Oct. 9, 2001, now Pat. No. 6,567,043, and a continuation-in-part of application No. 09/516,215, filed on Feb. 29, 2000, now Pat. No. 6,633,259.

(56) References Cited

U.S. PATENT DOCUMENTS

U.S. PATENT DOCUMENTS

| Patent No. | | Date | Inventor | Class |
|---|---|---|---|---|
| 3,668,403 | A | 6/1972 | Meilander | 701/121 |
| 3,705,404 | A | 12/1972 | Chisholm | 343/112 R |
| 3,792,472 | A | 2/1974 | Payne et al. | 342/32 |
| 4,079,414 | A | 3/1978 | Sullivan | 725/114 |
| 4,122,522 | A * | 10/1978 | Smith | 701/15 |
| 4,167,006 | A | 9/1979 | Funatsu et al. | 343/6.5 LC |
| 4,196,474 | A | 4/1980 | Buchanan et al. | 364/461 |
| 4,224,669 | A | 9/1980 | Brame | 701/8 |
| 4,229,737 | A | 10/1980 | Heldwein et al. | 343/6 R |
| 4,293,857 | A * | 10/1981 | Baldwin | 342/32 |
| 4,327,437 | A | 4/1982 | Frosch et al. | 714/3 |
| 4,359,733 | A | 11/1982 | O'Neill | 342/36 |
| 4,454,510 | A | 6/1984 | Crow | 343/5 |
| 4,524,931 | A | 6/1985 | Nilsson | 246/167 |
| 4,646,244 | A | 2/1987 | Bateman | 701/301 |
| 4,688,046 | A | 8/1987 | Schwab | 342/456 |
| 4,782,450 | A | 11/1988 | Flax | 364/461 |
| 4,811,308 | A | 3/1989 | Michel | 367/136 |
| 4,899,296 | A | 2/1990 | Khattak | 702/40 |
| 4,914,733 | A | 4/1990 | Gralnick | 340/961 |
| 4,958,306 | A | 9/1990 | Powell et al. | 702/40 |
| 5,075,694 | A | 12/1991 | Donnangelo et al. | 342/455 |
| 5,144,315 | A | 9/1992 | Schwab et al. | 342/49 |
| 5,153,836 | A | 10/1992 | Fraughton et al. | 364/461 |
| 5,191,342 | A | 3/1993 | Alsup et al. | 342/465 |
| 5,260,702 | A | 11/1993 | Thompson | 340/970 |
| 5,262,784 | A | 11/1993 | Drobnicki et al. | 342/45 |
| 5,268,698 | A | 12/1993 | Smith et al. | 342/450 |
| 5,283,574 | A | 2/1994 | Grove | 340/970 |
| 5,317,316 | A | 5/1994 | Sturm et al. | 342/30 |
| 5,365,516 | A | 11/1994 | Jandrell | 370/18 |
| 5,374,932 | A | 12/1994 | Wyschogrod et al. | 342/36 |
| 5,381,140 | A | 1/1995 | Kuroda et al. | 340/961 |
| 5,402,116 | A | 3/1995 | Ashley | 340/870.1 |
| 5,454,720 | A | 10/1995 | FitzGerald et al. | 434/27 |
| 5,506,590 | A | 4/1996 | Minter | 342/462 |
| 5,528,244 | A | 6/1996 | Schwab | 342/37 |
| 5,570,095 | A | 10/1996 | Drouilhet, Jr. et al. | 342/357 |
| 5,596,326 | A | 1/1997 | Fitts | 342/30 |
| 5,596,332 | A | 1/1997 | Coles et al. | 342/455 |
| 5,617,101 | A | 4/1997 | Maine et al. | 342/358 |
| 5,627,546 | A | 5/1997 | Crow | 342/352 |
| 5,629,691 | A | 5/1997 | Jain | 340/961 |
| 5,666,110 | A | 9/1997 | Paterson | 340/970 |
| 5,680,140 | A | 10/1997 | Loomis | 342/357 |
| 5,714,948 | A | 2/1998 | Farmakis et al. | 340/961 |
| 5,752,216 | A | 5/1998 | Carlson et al. | 701/120 |
| 5,774,829 | A | 6/1998 | Cisneros et al. | 701/213 |
| 5,781,150 | A | 7/1998 | Norris | 342/357 |
| 5,798,712 | A * | 8/1998 | Coquin | 340/970 |
| 5,839,080 | A | 11/1998 | Muller | 701/9 |
| 5,867,804 | A | 2/1999 | Pilley et al. | 701/120 |
| 5,884,222 | A * | 3/1999 | Denoize et al. | 701/301 |
| 5,890,068 | A | 3/1999 | Fattouce et al. | 455/456.2 |
| 5,999,116 | A | 12/1999 | Evers | 342/36 |
| 6,049,304 | A | 4/2000 | Rudel et al. | 342/357.08 |
| 6,085,150 | A | 7/2000 | Henry et al. | 701/301 |
| 6,088,634 | A | 7/2000 | Muller | 701/9 |
| 6,092,009 | A | 7/2000 | Glover | 701/14 |
| 6,094,169 | A | 7/2000 | Smith et al. | 342/465 |
| 6,122,570 | A | 9/2000 | Muller | 701/9 |
| 6,127,944 | A | 10/2000 | Daly | 340/963 |
| 6,133,867 | A | 10/2000 | Eberwine et al. | 342/29 |
| 6,138,060 | A | 10/2000 | Conner | 701/9 |
| 6,201,499 | B1 | 3/2001 | Hawkes et al. | 342/387 |
| 6,208,284 | B1 | 3/2001 | Woodell et al. | 342/30 |
| 6,211,811 | B1 | 4/2001 | Evers | 342/36 |
| 6,219,592 | B1 | 4/2001 | Muller et al. | 701/9 |
| 6,292,721 | B1 | 9/2001 | Conner et al. | 701/9 |
| 6,311,127 | B1 | 10/2001 | Stratton et al. | 701/213 |
| 6,314,363 | B1 | 11/2001 | Pilley et al. | 701/120 |
| 6,327,471 | B1 | 12/2001 | Song | 455/440 |
| 6,347,263 | B1 | 2/2002 | Johnson et al. | 701/14 |
| 6,380,870 | B1 | 4/2002 | Conner et al. | 340/970 |
| 6,384,783 | B1 | 5/2002 | Smith et al. | 342/387 |
| 6,445,310 | B1 | 9/2002 | Bateman et al. | 340/970 |
| 6,448,929 | B1 | 9/2002 | Smith et al. | 342/456 |
| 6,463,383 | B1 | 10/2002 | Baiada et al. | 701/120 |
| 6,469,664 | B1 | 10/2002 | Michaelson et al. | 342/357.13 |
| 6,477,449 | B1 | 11/2002 | Conner et al. | 701/4 |
| 6,567,043 | B2 | 5/2003 | Smith et al. | 342/450 |
| 6,571,155 | B2 | 5/2003 | Carriker et al. | 701/3 |
| 6,584,414 | B1 | 6/2003 | Green et al. | 702/33 |
| 6,606,034 | B1 | 8/2003 | Muller et al. | 340/970 |
| 6,615,648 | B1 | 9/2003 | Ferguson et al. | 73/146 |
| 6,633,259 | B1 | 10/2003 | Smith et al. | 342/456 |
| 6,691,004 | B2 | 2/2004 | Johnson | 701/14 |
| 6,707,394 | B2 | 3/2004 | Ishihara et al. | 340/970 |
| 6,710,723 | B2 | 3/2004 | Muller | 340/970 |
| 6,750,815 | B2 | 6/2004 | Michaelson et al. | 342/357.13 |
| 6,789,011 | B2 | 9/2004 | Baiada et al. | 701/120 |
| 6,812,890 | B2 | 11/2004 | Smith et al. | 342/454 |
| 6,873,903 | B2 | 3/2005 | Baiada et al. | 701/120 |
| 6,885,340 | B2 | 4/2005 | Smith et al. | 342/465 |
| 6,927,701 | B2 | 8/2005 | Schmidt et al. | 340/959 |
| 6,930,638 | B2 | 8/2005 | Lloyd et al. | 342/453 |
| 6,992,626 | B2 | 1/2006 | Smith | 342/454 |
| 7,123,169 | B2 | 10/2006 | Farmer et al. | 340/945 |
| 7,123,192 | B2 | 10/2006 | Smith et al. | 342/455 |
| 7,126,534 | B2 | 10/2006 | Smith et al. | 342/456 |
| 7,142,154 | B2 | 11/2006 | Quilter et al. | 342/357.06 |
| 2001/0026240 | A1 | 10/2001 | Neher | 342/357.07 |
| 2002/0021247 | A1 | 2/2002 | Smith et al. | 342/450 |
| 2002/0089433 | A1* | 7/2002 | Bateman et al. | 340/970 |
| 2003/0009267 | A1 | 1/2003 | Dunsky et al. | 701/4 |
| 2003/0097216 | A1 | 5/2003 | Etnyre | 701/120 |
| 2004/0004554 | A1 | 1/2004 | Srinivasan et al. | 340/870.01 |
| 2004/0044463 | A1 | 3/2004 | Shing-Feng et al. | 701/120 |
| 2004/0086121 | A1 | 5/2004 | Viggiano et al. | 380/255 |
| 2004/0225432 | A1 | 11/2004 | Pilley et al. | 701/117 |
| 2005/0021283 | A1 | 1/2005 | Brinton et al. | 702/150 |

| | | | |
|---|---|---|---|
| 2005/0046569 A1 | 3/2005 | Spriggs et al. | 340/551 |
| 2006/0119515 A1 | 6/2006 | Smith | 342/450 |
| 2006/0191326 A1 | 8/2006 | Smith et al. | 73/73 |
| 2006/0276201 A1 | 12/2006 | Dupray | 455/456.1 |
| 2007/0001903 A1 | 1/2007 | Smith et al. | 342/387 |
| 2007/0159378 A1 | 7/2007 | Powers et al. | 342/29 |

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |
| WO | WO 94/14251 | 6/1994 |
| WO | WO 99/50985 | 10/1999 |

OTHER PUBLICATIONS

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Customers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez (*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Tract and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

Automated Correlation of Aircraft Flight Tracks and Events with ATC Data, Alex Smith, Rannoch Corporation, 1800 Diagonal Rd, Suite 430, Alexandria, VA 22314, USA undated.

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, ☐IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

Aircraft Noise Report, vol. 17, No. 1, Jan. 31, 200.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.

ASA MASPS—Change Issue, Michael Petri, Oct. 23, 2002.

ASA MASPS—Change Issue, J. Stuart Searight, Nov. 18, 2002.

ASA MASPS—Change Issue, Michael Petri, Dec. 16, 2002.

ASA MASPS—Change Issue, J. Stuart Searight, Jan. 23, 2003.

ASA MASPS—Change Issue, Tony Warren, Feb. 3, 2003.

ASA MASPS—Change Issue, Steve George, Apr. 23, 2003.

ASA MASPS—Change Issue, James Maynard, Apr. 23, 2003.

ASA MASPS—Change Issue, T.E. Foster, Jun. 11, 2003.

ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges at Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management, Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prized by International Air Traffic Authorities, Feb. 2, 2005, http://www.raytheon.co.uk/news_room/news/press_02022005.pdf.
Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment with DO-242A (RTCA ADS-B MASPS) WG51/SG2, NASA, Sep. 2003.
Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke Radar, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp711079482021710.pdf Nov. 2004.
*Cel-Loc How We Do it, Technology Overview*, http://www.cell-loc.com/how_tech.html, Oct. 2, 2006, original date unknown.
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Avionics Systems Conference, Oct. 15, 2006.
Damarel Systems International, LTD, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers?* Aircraft Traffic Technology International 2005, Vladmir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, Siemens, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Protest Letter dated May 16, 2002 from Otto M. Wildensteiner, U.S. Department of Transportation, Washington, DC.
"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, Aug. 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages", Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

* cited by examiner

METHOD AND APPARATUS TO IMPROVE ADS-B SECURITY

CROSS-REFERENCE TO RELATED APPLICATIONS

The present application is a Continuation-In-Part of U.S. patent application Ser. No. 11/203,823, filed Aug. 15, 2005, incorporated herein by reference in its entirety;

Application Ser. No. 11/203,823, filed Aug. 15, 2005 is a Continuation-in-Part of U.S. patent application Ser. No. 10/830,444, filed on Apr. 23, 2004, now U.S. Pat. No. 7,123,192, incorporated herein by reference in its entirety;

Application Ser. No. 10/830,444, filed on Apr. 23, 2004 is a DIVISIONAL of U.S. patent application Ser. No. 10/457,439, filed on Jun. 10, 2003, Now U.S. Pat. No. 6,885,340, incorporated herein by reference in its entirety;

Application Ser. No. 10/457,439, in turn is a Non-Provisional of Provisional U.S. patent application Ser. No. 60/440,618, filed on Jan. 17, 2003, incorporated herein by reference in its entirety;

Application Ser. No. 10/457,439 is also a Continuation-In-Part of U.S. patent application Ser. No. 10/319,725, filed on Dec. 16, 2002, now U.S. Pat. No. 6,812,890, incorporated herein by reference in its entirety;

Application Ser. No. 10/319,725 in turn is Non-Provisional of Provisional U.S. patent application Ser. No. 60/343,237, filed on Dec. 31, 2001, incorporated herein by reference in its entirety;

Application Ser. No. 10/319,725 is also a Continuation of U.S. application Ser. No. 09/971,672, filed on Oct. 9, 2001, now U.S. Pat. No. 6,567,043, incorporated herein by reference in its entirety;

Application 09/971,672 is in turn a DIVISIONAL of U.S. patent application Ser. No. 09/516,215, filed Feb. 29, 2000, now U.S. Pat. No. 6,633,259, incorporated herein by reference in its entirety;

Application No. 09/516,215 is a Non-Provisional of Provisional U.S. patent application Ser. No. 60/123,170 filed Mar. 5, 1999, incorporated herein by reference in its entirety;

Application 10/457,439 is also Continuation-In-Part of U.S. patent application Ser. No. 09/516,215, filed Feb. 29, 2000, now U.S. Pat. No. 6,633,259, incorporated herein by reference in its entirety;

Application No. 09/516,215 is a Non-Provisional of Provisional U.S. patent application Ser. No. 60/123,170, filed Mar. 5, 1999; incorporated herein by reference in its entirety;

The present application is Continuation-In-Part of U.S. patent application Ser. No. 10/743,042, filed Dec. 23, 2003; now U.S. Pat. No. 7,132,982, incorporated herein by reference in its entirety;

Application 10/743,042 is a Continuation-In-Part of U.S. patent application Ser. No. 10/638,524, filed on Aug. 12, 2003; now U.S. Pat. No. 6,806,826, incorporated herein by reference in its entirety;

The present application is a Continuation-In-Part of U.S. patent application Ser. No. 11/031,457 filed on Jan. 7, 2005, incorporated herein by reference in its entirety;

Application 11/031,457 is a Non-Prov. of U.S. patent application Ser. No. 60/534,706, filed Jan. 8, 2004, incorporated herein by reference in its entirety;

The present application is a Continuation-In-Part of U.S. patent application Ser. No. 10/756,799, filed on Jan. 14, 2004, now U.S. Pat. No. 7,126,534, incorporated herein by reference in its entirety;

Application 10/756,799 is a Continuation-In-Part of U.S. patent application Ser. No. 10/751,115, filed on Jan. 5, 2004, now U.S. Pat. No. 6,992,626;

The present application is a Continuation-In-Part of U.S. patent application Ser. No. 11/111,957, filed on Apr. 22, 2005, incorporated herein by reference in its entirety;

The present application is a Continuation-In-Part of U.S. patent application Ser. No. 11/145,170, filed on Jun. 6, 2005, incorporated herein by reference in its entirety;

The present application is a Continuation-In-Part of U.S. patent application Ser. No. 11/203,823, filed on Aug. 15, 2005, incorporated herein by reference in its entirety;

The present application is a Continuation-In-Part of U.S. patent application Ser. No. 11/209,030 filed on Aug. 25, 2005.

The subject matter of the present application is related to the following issued U.S. Patents, assigned to the same assignee as the present invention, all of which are incorporated herein by reference in their entirety:

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction"; U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,384,783, issued on May 7, 2002, entitled "Method and Apparatus for Correlating Flight Identification Data With Secondary Surveillance Radar Data";

U.S. Pat. No. 6,448,929, issued Sep. 10, 2002, entitled "Method and Apparatus for Correlating Flight Identification Data With Secondary Surveillance Radar Data";

U.S. Pat. No. 6,567,043, issued May 20, 2003, entitled "METHOD AND APPARATUS FOR IMPROVING THE UTILITY OF AUTOMATIC DEPENDENT SURVEILLANCE";

U.S. Pat. No. 6,633,259 issued Oct. 14, 2003 "METHOD AND APPARATUS FOR IMPROVING THE UTILITY OF AUTOMATIC DEPENDENT SURVEILLANCE";

U.S. Pat. No. 6,806,829, issued Oct. 19, 2004, entitled "METHOD AND APPARATUS FOR IMPROVING THE UTILITY OF AUTOMATIC DEPENDENT SURVEILLANCE";

U.S. Pat. No. 6,812,890, issued Nov. 2, 2004, entitled "VOICE RECOGNITION LANDING FEE BILLING SYSTEM"; and U.S. Pat. No. 6,885,340, issued Apr. 26, 2005, entitled "CORRELATION OF FLIGHT TRACK DATA WITH OTHER DATA SOURCES".

FIELD OF THE INVENTION

The present invention relates to a Method and Apparatus to improve ADS-B Security. In particular, the present invention relates to techniques for using other data sources to validate the annunciated position of an aircraft and validate the annunciated identity of an aircraft as reported by ADS-B.

BACKGROUND OF THE INVENTION

Automatic Dependent Surveillance (ADS), a new standard adopted by many aviation authorities worldwide offers a great leap forward in aircraft surveillance capabilities. More information is made available than before with conventional primary and secondary radar technologies, and as ADS-B does not require major conventional radar ground infrastructure, the cost of implementation is far lower than Prior Art techniques.

Whether ADS will allow the decommissioning of primary conventional radars is the subject of many ongoing debates. However, most nations see the benefits in the implementation of a relatively low cost flight tracking technology. Countries with vast tracts of land or mountainous terrain that is not viable for conventional radar see the technology as highly cost beneficial.

Countries ranging from Australia to Taiwan have adopted ADS-B technology. Many working groups consisting of members of the international aviation community have participated in the development of many aircraft avionics and ground systems standards, for example RTCA Special Committee 186, which developed the ADS-B MASPS. A selection of some of the Committee's issue papers are listed below, and incorporated herein by reference. Additional papers, on the subject are available from http://adsb.tc.faa.gov/RFG.htm, also incorporated herein by reference.

The aforementioned Issue Papers, all of which are incorporated here by reference:

| File Name (*.PDF) | Size | Date | Status | Description |
|---|---|---|---|---|
| ASA-ASAS-Issue-Papers.zip | 1.5 m | Nov. 23, 2004 | — | ZIP file containing all submitted issue papers (1-20) |
| Blank ASAS Issue Paper.zip | 8k | — | — | Blank submission form |
| IP01 TCAS ASA MASPS Issue | 14k | Apr. 23, 2003 | Withdrawn | TCAS Platform Usage |
| IP02 Degraded Target Utility Indicator | 16k | Apr. 23, 2003 | Closed | Degraded Target Utility Indicator |
| IP03 ASSAP Ownship Data Processing | 19k | Apr. 23, 2003 | Closed | Specifications are needed for ASSAP processing of Ownship data and interfaces from ASSAP to the ADS-B transmitting subsystem |
| IP04 Unknown SIL. | 15k | Apr. 23, 2003 | Open | Legacy GPS Systems are unable to provide values for SIL |
| IP05 Application Names and Acronyms | 38k | Apr. 23, 2003 | Deferred | Recommendations for changing the naming and acronym conventions for Airborne Surveillance Applications. |
| IP06 Minimum Data Quality Requirements | 17k | Apr. 23, 2003 | Closed | Cautions against placing minimum output requirements on ADS-B data. |
| IP07 Enhanced SIL Bit Definitions | 21k | Apr. 23, 2003 | Closed | Requests that SIL definitions be extended to include intermediate values than those specified in DO-242A. |
| IP08 CDTI - Ownship Directionality | 59k | Apr. 23, 2003 | Open | Proposal to address CDTI display requirements when ownship loses its directionality information. |
| IP09 CDTI - Display of Position Uncertainty | 54k | Apr. 23, 2003 | Open | Proposal for how CDTI symbology might represent position uncertainty. |
| IP10 CDTI - Altitude Usage | 15k | Jun. 18, 2003 | Open | Requests clarification on best choice of altitude source (i.e. baro vs. geo) for determining relative and absolute altitude of displayed CDTI traffic. |
| IP11 ASA - Continuity in Tables 2-3 & 3-1 | 64k | Jan. 13, 2004 | Pending | Identification of an inconsistency of continuity requirements between Tables 2-3 and 3-1 in ASA MASPS. |
| IP12 ASA - Air-Ground Determination | 66k | Jan. 13, 2004 | Pending | Problems with ASA MASPS air/Ground determination when A/V has no automatic detection means. |
| IP13 ASSAP - TIS-B Registration | 58k | Feb. 13, 2004 | Pending | Request to coordinate with WG2 that the TIS-B MASPS requires the appropriate registration functions between ADS-B and ground sensors such as SSR. |
| IP14 STP - Velocity Lag Indicator | 64k | Sep. 10, 2004 | Pending | Proposal for new ADS-B field to convey velocity tracker lag. |
| IP15 ASA - ADS-B OUT Power Switch | 66k | Sep. 10, 2004 | Pending | Question as to whether there needs to be a requirement for ADS-B Out systems to have an ON/OFF switch available to the pilot |
| IP16 ASA - Surface Vehicles in Tunnels | 58k | Sep. 1, 2004 | Pending | Problem of Surface Vehicles which operate on in tunnels under runways and taxiways. How do Aircraft track these vehicles without placing them on the runways or taxiways? |
| IP17 CDTI - ADS-B TCAS Symbol Directionality | 25k | Nov. 3, 2004 | Open | Summation of issue of whether or not CDTI should introduce directionality indication onto TCAS targets. |
| IP18 CDTI - Velocity Vector Issues | 718k | Nov. 3, 2004 | Open | Summation of issues related to using velocity vectors for CDTI targets. |

-continued

| File Name (*.PDF) | Size | Date | Status | Description |
|---|---|---|---|---|
| IP19 ASSAP - Received NUC means Integrity unknown | 17k | Nov. 2, 2004 | Pending | Since there is no means on the receive side to determine if transmitting DO-260 compliant systems are also TSO C166 compliant, integrity must be assumed to be ZERO for received data. |
| IP20 ASSAP - Limit of NIC & NAC to 8 or less | 18k | Nov. 2, 2004 | Pending | NIC & NAC values of 9 or greater are defined with vertical considerations. Since initial STP MOPS will not address these factors, ASSAP must not use values greater than 8 for these fields. |

The FAA has also successfully used ADS-B in a program called CAPSTONE, (See, http://www.alaska.faa.gov/capstone/, incorporated herein by reference). The Taiwan CAA started a combined ADS-B and multilateration program in the past few years as detailed on the website: http://www-.caa.gov.tw/files/org/CNS_ATMSite/Surveillance.htm, also incorporated herein by reference.

The Taiwan CAA website contains a good description of ADS-C. The website explains that in order to meet the ADS operational requirements, the following four types of contract are supported. The first is the Demand contract 150, in which an aircraft provides data immediately and only once illustrated in FIG. 1, (ADS-C demand contract model). Referring to FIG. 1, control center 140 may send a request 110 for a transmission to aircraft 120. This request 110 may include a transmission number and transmission time (current time). The request is generally sent once only. In response to the request 110, aircraft 120 sends a message transmission 130 which may include aircraft identification and location data and an end of transmission signal. The control center 140 may then use this information to update aircraft position information on a control screen or the like, or for other purposes.

The second type of contract is the Periodic contract 250, in which an aircraft provides data periodically as shown in FIG. 2 (ADS-C periodic contract model). Referring to FIG. 2, control center 240 may send a request 210, which includes a transmission interval of X minutes, to aircraft 220. Aircraft 220 then sends a reply transmission 232 and then after the X minute (or other time interval) a second transmission 234, and a third transmission 236, and so forth. Each transmission 232, 234, 236, et al. may include aircraft identification and position information as well as other aircraft information. The control center 240 may then use this information to update aircraft position information on a control screen or the like, or for other purposes.

The third type of contract is the Event contract, in which an aircraft provides information when certain events are detected by aircraft avionics as shown in FIG. 3 (ADS-C event contract model). In the Event contract, a transmission may be generated by the aircraft whenever one or more events occurs. Examples of such events may include a way point change 310, in which the aircraft passes through a waypoint and/or heads toward another waypoint on an airchart. Another event example may include a speed change 320 in which the aircraft velocity changes (in this example from mach 0.82 to Mach 0.78). A third example is an altitude change, in which an aircraft changes from a particular latitude or from an assigned altitude. A fourth example is a heading/track change, in which an aircraft changes from a particular heading or predetermined track. These four examples of events are not inclusive, and other events may be used to trigger event reporting.

The fourth type of contract is the Emergency contract, in which an aircraft provides data, in the case of an emergency. In this type of contract, a transmission is generated if one or more emergency conditions are triggered, including automatically determined emergency conditions (loss of cabin pressure, engine out, or the like) and pilot indicated emergencies.

With ADS-B, the aircraft transmits aircraft parameters derived from an on-board navigation system via a broadcast data link to other aircraft or the ground control stations, and can be used to monitor the airport surface status as illustrated in FIG. 4 (ADS-B application). Referring to FIG. 4, aircraft 420 may derive position information from signals received from (for example) global positioning system satellite 460. When interrogated by air traffic radar 445 or in response to other indicia, aircraft 420 may emit transponder data (e.g., identification and/or altitude data and/or other data), which may be received by radar 445 such that Air Traffic Management center 440 may track the aircraft.

In addition, aircraft 420 may emit an ADS-B signal, which may be received by antenna 470 and/or other aircraft 425. ADS-B data may include information as to aircraft position and altitude, aircraft identification, and other data. This data may be used to identify and track aircraft and also provide other features, such as collision avoidance.

ADS-B signals may also be multilaterated by measuring the time difference of arrival (TDOA) at multiple antenna sites 470 to indicate aircraft position. The assignee of the present application has developed a number of techniques for implementing such multilateration, as described in the various Patents and applications previously incorporated by reference.

Other aviation authorities have also embraced the use of wide area multilateration coupled with ADS-B, including Austrocontrol as discussed in Aviation Week and Space Technology, Mar. 7, 2005, page 44-45, incorporated herein by reference. Some detractors of the technology have raised security concerns, such as Darryl Phillips, who wrote and distributed *ADS-B, Automatic Dependent Surveillance—Broadcast Will ADS-B Increase Safety and Security for Aviation?* first written in Mar. 1999, revised Jul. 2000, by Darryl H. Phillips, AirSport Corporation, 1100 West Cherokee, Sallisaw Okla. 74955. See, http://www.airsport-corp.com/adsb2.htm, also incorporated herein by reference.

Other companies have also raised some security concerns and have come up with various solutions including secure communications links. See, for example Published U.S. Patent Application Publication No. 20040086121, entitled Secure Automatic Dependent Surveillance, also incorporated herein by reference. Others have attempted to develop methods to fuse data from disparate sources, attempting to build high confidence or "robust" data fusion processes, as illustrated for example in Published U.S. Patent Application Publication No. 20040130479, also incorporated herein by reference.

Another security concern is the prevention of a pilot (or terrorist) turning off the ADS-B transponder, as was the case with the hijacked aircraft on Sep. 11, 2001. This has lead to many methods such as Published U.S. Patent Application Publication Nos. 20040148067 and 20030060941, entitled Uninterruptible ADS-B System for Aircraft Tracking, both of which are incorporated herein by reference.

U.S. Pat App 20030193409 describes a method and apparatus for tracking aircraft and securing against unauthorized access. This approach uses the aircraft's derived surveillance information in conjunction with GIS data to determine if an aircraft is off course. Other methods include building confidence levels in target positions using correlation techniques, such as that described in Published U.S. Patent Application No. 20030154018, entitled Multi-source target correlation, incorporated herein by reference.

As noted in the references cited above, the threat of ADS-B spoofing is of concern to many parties. Altering the existing ADS-B infrastructure to prevent such spoofing would require extensive investment in revising existing infrastructure and also changing out ADS-B equipment in existing aircraft. Such a radical overhaul of the ADS-B system is not cost-effective or practical. A technique for detecting ADS-B spoofing which is independent of ADS-B systems is required.

The assignee of the present application has developed an array of equipment and software and systems for tracking and identifying aircraft based upon multilateration—using aircraft radio signals to detect position and identification of an aircraft. As multilateration moved from an airport-based system to off airport applications such as wide area it became necessary to find sites off-airport to place the sensors. Off airport sites needed to have power, telecommunication, security and the ability to position antennas at reasonable heights to overcome obstructions to achieve line of site to aircraft.

In some of the earlier sites, such as T. F. Green airport in Providence, R. I. and Hyannis Airport in Barnstable, Mass., off airport sites included tops of various buildings, and Government owned communication towers. Because of the nature of the equipment at that time including the frequency use and large physical size and architecture it was not thought practical that commercial cell phone towers could be used.

SUMMARY OF THE INVENTION

The present invention includes a number of embodiments for improving security of ADS-B transmissions. In a first embodiment, alerting is based on position spoofing. Annunciated position may be provided from various implementations of ADS-B such as the Universal Access Transceiver (UAT), VHF Data Link (VDL), and 1090 MHz ADS-B. Sources such as wide area multilateration, primary and Secondary Surveillance Radar (SSR), conventional rotating radar, and passive radar, such as the Megadata PASSUR (www.megadata.com), may provide derived position.

The annunciated positions may be correlated through a Traffic Information Service Broadcast (TIS-B) system. The annunciated position source may then be compared with the derived source and a determination is made regarding the difference between the results. A nominal difference is expected between the two results as each source has different error sources, which are generally known and are estimable. Any position difference greater than an amount significantly greater than the combination of the error sources is then a cause for concern and can be used to generate an alert. Averaging of several results may be used to increase confidence in an alert state. Alerts may then be sent to the aircraft, other aircraft, ground positions, and other third parties for interception or targeting.

In a second embodiment, alerting may be based on identification spoofing. Many different sources of the aircraft's ID are shown, ranging from surveillance sources (radar, ADS-B, and the like) and communications sources (ACARS, CPDLC, and the like). Each of these sources offers some of form of identity for the aircraft, be it Mode S/ADS-B 24 bit codes, ATC flight number, or flight number. From these sources a correlated ID is available which will have an associated confidence based on the number of sources and the level of agreement on the information.

Added to this are the dynamics of the aircraft, which include the velocity, flight level, vertical descent/ascent rates, and the like. The aircraft dynamics may be correlated with the announced ID for consistency, for example certain aircraft are capable of operating only at certain flight levels or velocities. Aircraft dynamics are computed from the various surveillance sources.

Add to this, a priori information on the aircraft and location, such as schedule information, and normal operations, to give a further layer of data, which may be used to assist in the confidence of aircraft identity.

In a third embodiment, alerting may be based on spoofing of identity and position. In this embodiment, a combination of the elements of first and second embodiments are used to give a high confidence alert that a particular aircraft is announcing an incorrect identity, position, or both.

All embodiments may be implemented using stand-alone equipment, which does not require an overhaul or modification of existing ADS-B equipment, either on the ground or on the aircraft. This equipment may be mounted at an airport, or even off-site. Through equipment redesign to conform with cell tower use, loading, and other factors, multilateration sensor equipment was approved for installation on cell towers, which, due to their high number and availability, made for a very practical way to set up surveillance network of multilateration and ADS-B sensors.

DETAILED DESCRIPTION OF THE INVENTION

Figure 1:
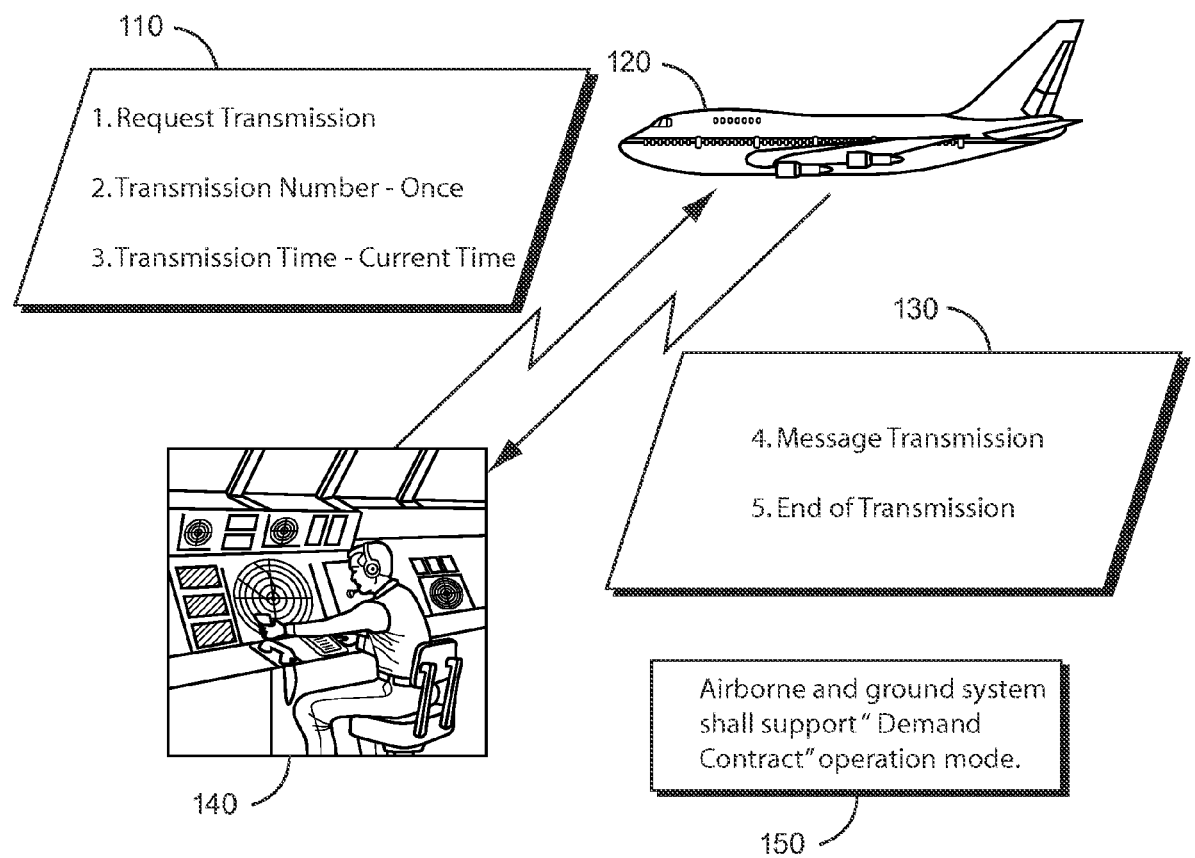
FIG. 1 is a block diagram illustrating the ADS-C demand contract model.
Figure 2:
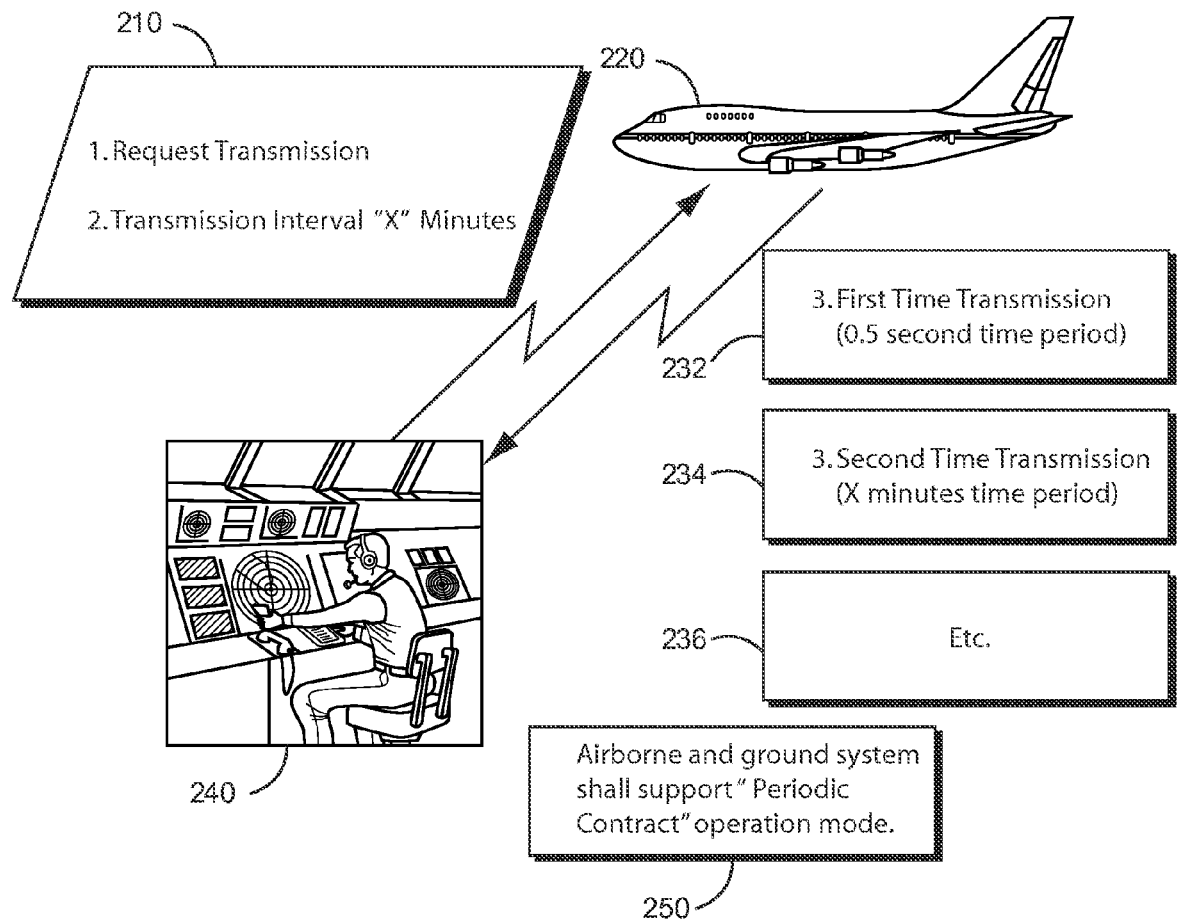
FIG. 2 is a block diagram illustrating the ADS-C periodic contract model.
Figure 3:
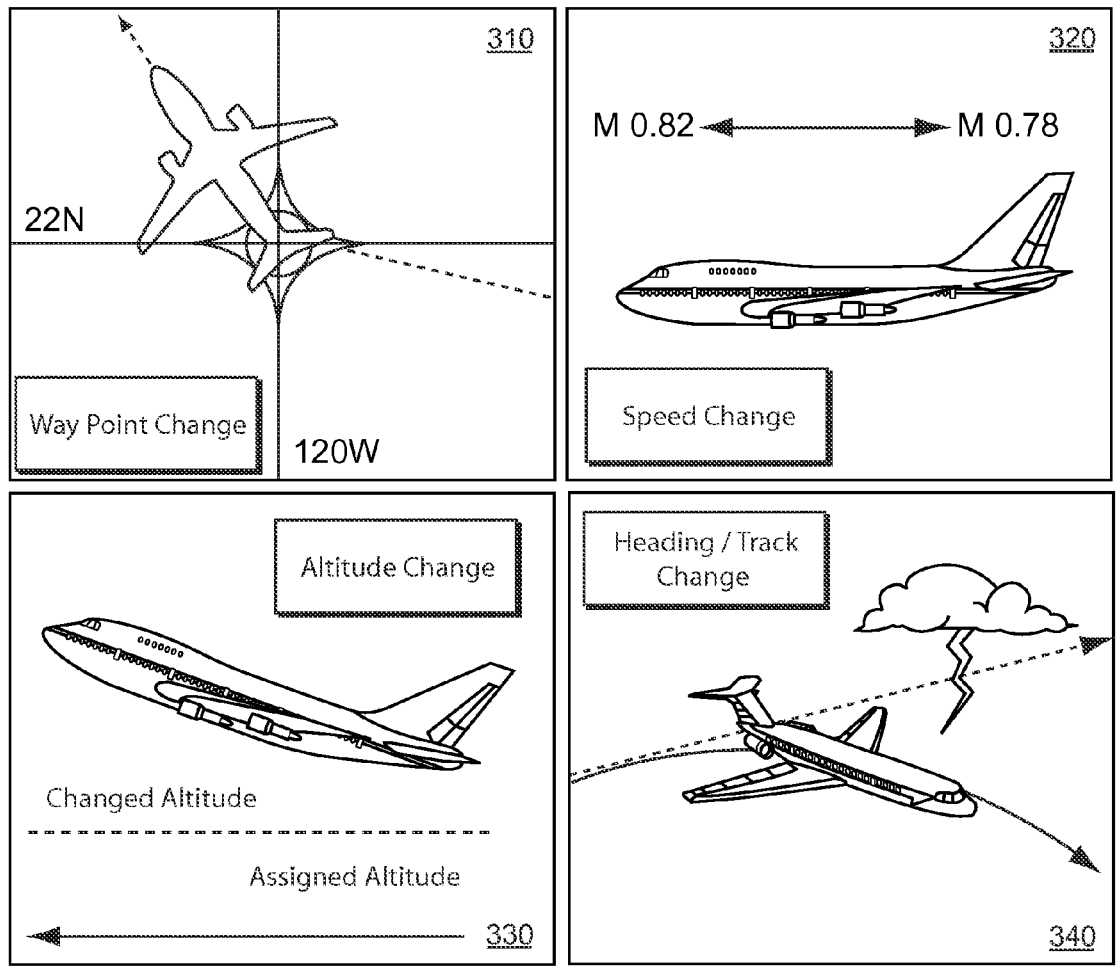
FIG. 3 is a block diagram illustrating the ADS-C event contract model.
Figure 4:
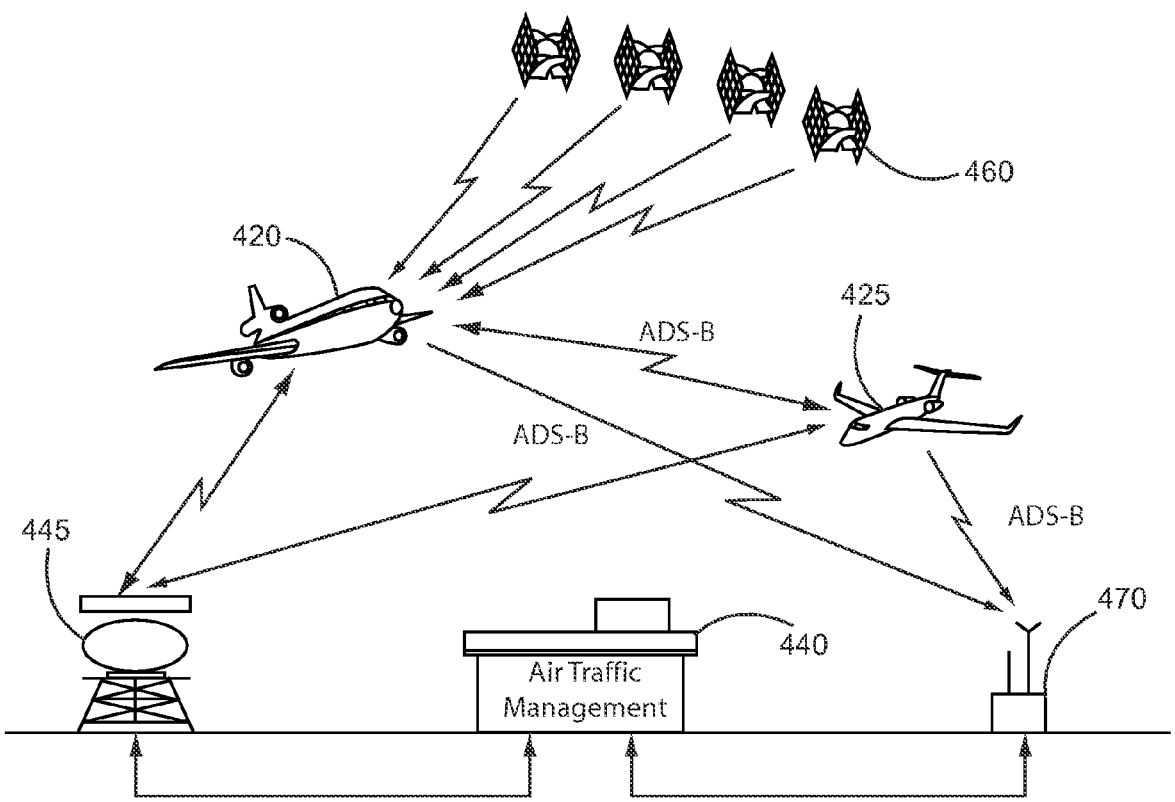
FIG. 4 is a block diagram illustrating ADS-B Applications.
Figure 5:
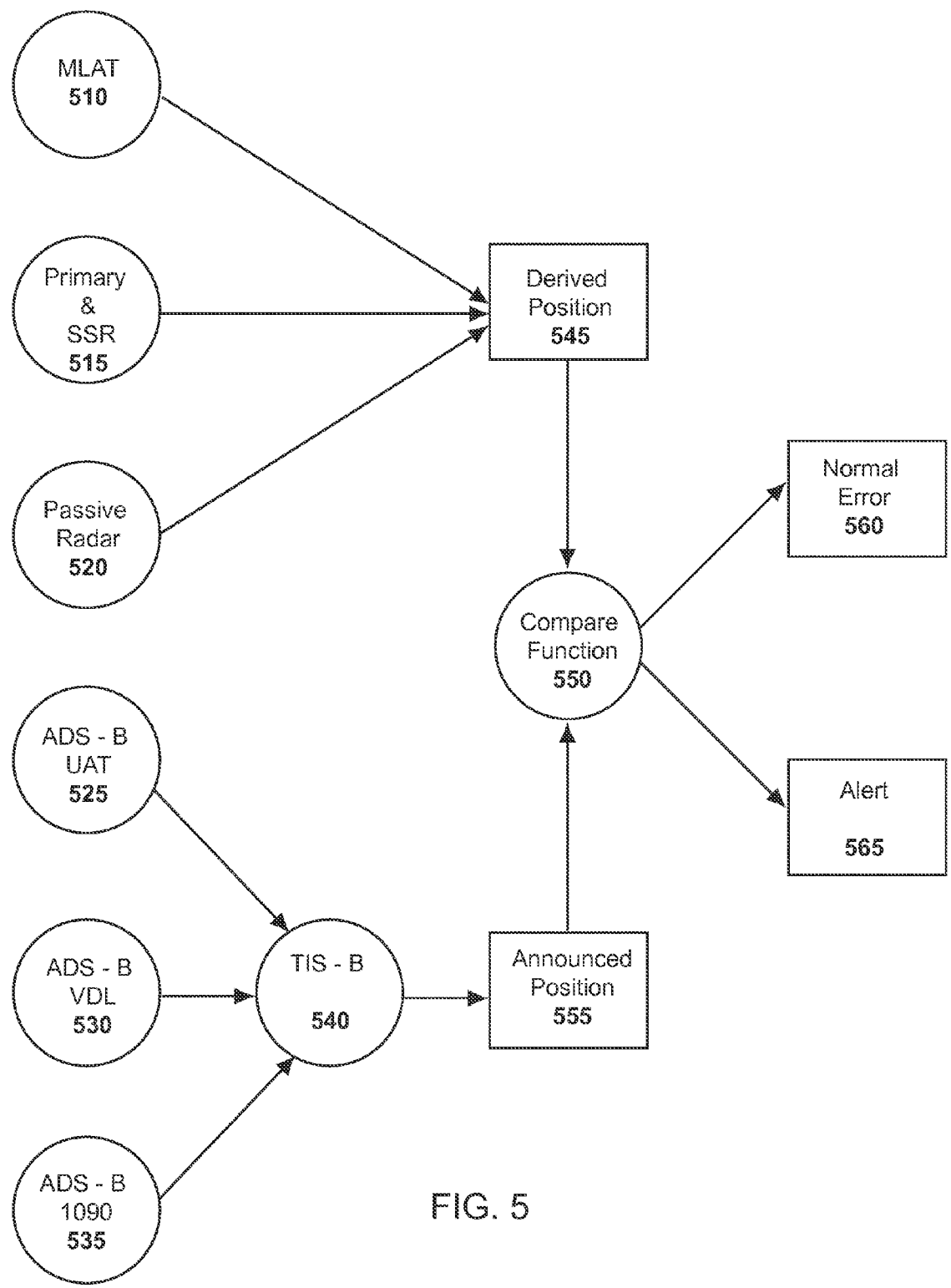
FIG. 5 illustrates a first embodiment of the present invention.

In a first embodiment, alerting may be triggered based upon position spoofing. Referring to FIG. 5, the embodiment shows the aircraft tracking data sources 510, 515, 520, 525, 530, and 535 on the left side, where the top three (510, 515, and 520) are derived position and the bottom three (525, 530, 535) are annunciated position. MLAT data source 510 may include aircraft position data generated from an aircraft radio signal multilateration system as described, for example, in the aforementioned Patents and pending Patent Applications previously incorporated by reference, from which the present application claims priority in whole or part.

Annunciated position 555 may be obtained from various implementations of ADS-B such as the Universal Access Transceiver (UAT) 525, VHF Data Link (VDL) 530, and 1090 MHz ADS-B 535, collectively labeled as TIS-B 540. Derived position 545 may be obtained from sources such as wide area multilateration 510, primary and Secondary Surveillance Radar (SSR) 515, conventional rotating radar, and passive radar 510, such as the Megadata PASSUR (www.megadata.com).

Annunciated position 555 may be correlated through a Traffic Information Service Broadcast (TIS-B) system. The annunciated position source may then be compared 550 with the derived source and a determination is made regarding the difference between the results.

A nominal difference 560 may be expected between the two results as each source has different error sources and ranges, which are generally known and are estimable. Any difference significantly greater than the combination of the error sources is then a cause for concern and can be used to generate an alert 565. Averaging of several results may be used to increase confidence in an alert state.

Alerts may then be sent to the aircraft, other aircraft, ground positions, and other third parties for interception or targeting.

Figure 6:
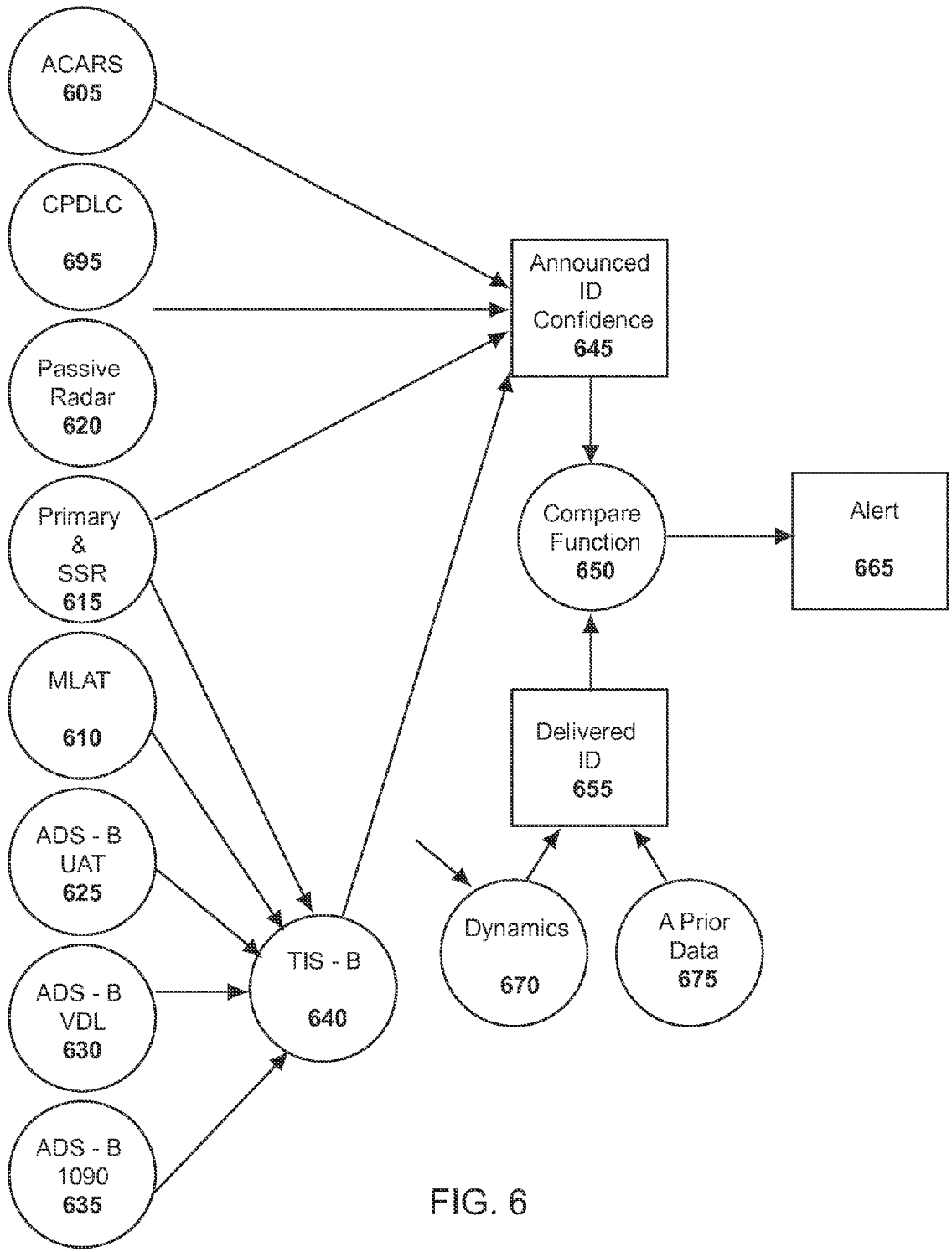
FIG. 6 illustrates an embodiment to determine spoofing of aircraft identity.

FIG. 6 illustrates a second embodiment of the present invention in which alerting may be triggered by identification spoofing. On the left many different sources of the aircraft's ID are shown, ranging from surveillance sources such as radar, ADS-B, and the like, as represented by 610,5215,620, 625, 630, and 635 and communications sources such as ACARS 605, CPDLC 695 and the like. Each of these sources offers some of form of identity for the aircraft, be it Mode S/ADS-B 24 bit codes, ATC flight number, or flight number. Aircraft identification may be obtained from various implementations of ADS-B such as the Universal Access Transceiver (UAT) 625, VHF Data Link (VDL) 630, and 1090 MHz ADS-B 635, primary and Secondary Surveillance Radar (SSR) 615, conventional rotating radar, and passive radar 610, such as the Megadata PASSUR (www.megadata.com), collectively labeled as TIS-B 640.

From these sources a correlated ID 645 may be derived which will have an associated confidence based on the number of sources and the level of agreement on the information.

Added to this is the dynamics of the aircraft 670, which is the velocity, flight level, vertical descent/ascent rates and the like. Aircraft dynamics 670 may be correlated with the announced ID 645 for consistency, for example certain aircraft are capable of operating only at certain flight levels or velocities or the like. A Cessna 150 is not going to operate at 35,000 feet, for example, and if aircraft identification data indicates such a discrepancy, the aircraft dynamics module 670 of the present invention will detect such an anomaly in the data. Similarly, if the ADS-B signal from a helicopter indicates that it is in fact a 747, the system may detect such spoofing, if the system shows the helicopter hovering (as determined by position data), a feat impossible for a 747.

Aircraft dynamics may be computed from the various surveillance sources shown on the left of the diagram, and aircraft performance criteria may be manually programmed or retrieved from a number of known aircraft performance databases. Various aircraft performance indicia may include minimum (stall) and maximum (VNE) velocities, climb rates, maximum altitude (ceiling), as well as other performance characteristics.

Add to this, a priori information 675 on the aircraft and location, such as schedule information, and normal operations, to give a further layer of data that can be use to assist in the confidence of an aircraft's identity. For example, if an aircraft is scheduled to arrive at a particular airport, based upon airline flight schedule information, and the system shows this aircraft arriving at a different airport, identification of the aircraft may be in doubt.

Compare function 650 weights these factors together—the ID confidence 645, as well as the aircraft dynamics 670 and a priori data 675 (collectively derived ID 655). Weighting factors may be used to determine whether an alert 665 should be generated.

In a third embodiment, alerting may be based on spoofing of both identity and position. It is possible to implement an embodiment that uses a combination of the elements of both the first and second embodiments of FIGS. 5 and 6 to give a high confidence alert that a particular aircraft is announcing an incorrect identity, position, or both. In this third embodiment, weighting factors may be applied to each data source and moreover, to each comparison of data sources (or groups of sources). If a number of discrepancies occur, an alert may be generated.

For example, from a priori data, it may be indicated that a flight scheduled to land at Washington National Airport is in fact, landing at Dulles Airport. Of course, such a discrepancy could occur due to weather conditions, mechanical problems, closed runways, or any number of legitimate reasons. The lack of correlation of a priori data may or may not be grounds for generating an alert.

Similarly, position errors can occur due to perfectly innocent causes. For example, if transponder barometric calibration is not properly set, an aircraft may report an incorrect altitude, which when compared to other data may show a discrepancy. Depending upon weighting factors, this error alone may not be enough to trigger an alarm.

However, if this a priori data indicates a discrepancy, and a position error is detected between reported and actual position, an alarm may be generated. This scenario is by way of example only and is not limiting. Weighting factors and combinations of alarm indicia can be fine-tuned dynamically or in the field depending upon the number of false alarms generated and based upon actual experience in the field.

By using data fusion processes pioneered by the Rannoch Corporation, assignee of the present application, the perceived problem of ADS-B and/or other identity spoofing, as described in the Background of the Invention, can be solved. Moreover, since the present invention does not require any changes to existing aircraft equipment or ADS-B infrastructure, the present invention addresses these security concerns without disrupting the existing ADS-B system.

As noted above, the equipment of the present invention may be installed at an airport or even off-site. Multilateration antennas may be adapted for use on cell phone towers to make installation even simpler. As such, a system can be easily and inexpensively installed to detect ADS-B spoofing and thus prevent or at least warn of the nightmare scenarios described in the Prior Art with regard to possible terrorist use of ADS-B spoofing to conceal true aircraft identity and position.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A system for authenticating aircraft identification signals, comprising:

a first input for receiving an annunciated aircraft position and identification from at least one aircraft generated source, indicating identification of at least one of aircraft type, aircraft identification, flight identification, and aircraft performance, a second input for receiving a derived aircraft position from a non-aircraft generated source, indicating position and identification of the aircraft, indicating identification of at least one of aircraft type, aircraft identification, flight identification, and aircraft performance, a comparator, for comparing the annunciated aircraft position with the derived aircraft position and generating an alarm if the annunciated aircraft position is not within a predetermined range of the derived aircraft position, and for comparing the annunciated aircraft identification with the derived aircraft identification and generating an alarm if the annunciated aircraft identification is not within a predetermined range of the derived aircraft identification.

2. The system of claim 1, wherein the aircraft generated source includes one or more of ADS-B such as the Universal Access Transceiver (UAT), VHF Data Link (VDL), and 1090 MHz ADS-B.

3. The system of claim 1, wherein the non-aircraft generated source includes one or more of a multilateration system, primary and Secondary Surveillance Radar (SSR), conventional rotating radar, and passive radar.

4. The system of claim 1, wherein annunciated positions and identifications may be correlated through a Traffic Information Service Broadcast (TIS-B) system.

5. The system of claim 1, wherein the predetermined range is derived from a combination of the error sources for the annunciated position source and the derived position sources.

6. The system of claim 1, wherein aircraft performance comprises dynamics of the aircraft, which include one or more of minimum and maximum velocities, flight levels, and vertical descent/ascent rates.

7. The system of claim 1, wherein flight identification includes schedule information.

8. The system of claim 3, wherein the multilateration system includes a plurality of antennas, at least some of which are mounted to cellular phone towers.

* * * * *